United States Patent
Senarath et al.

(10) Patent No.: US 8,311,055 B2
(45) Date of Patent: Nov. 13, 2012

(54) SYSTEM AND METHOD FOR SCHEDULING USERS ON A WIRELESS NETWORK

(75) Inventors: Gamini Senarath, Nepean (CA); Israfil Bahceci, Nepean (CA); Peiying Zhu, Ottawa (CA); Aaron Callard, Ottawa (CA)

(73) Assignee: Futurewei Technologies, Inc., Plano, TX (US)

( * ) Notice: Subject to any disclaimer, the term of this patent is extended or adjusted under 35 U.S.C. 154(b) by 230 days.

(21) Appl. No.: 12/633,623

(22) Filed: Dec. 8, 2009

(65) Prior Publication Data

US 2011/0134812 A1 Jun. 9, 2011

(51) Int. Cl.
*H04B 7/212* (2006.01)
(52) U.S. Cl. ........................................ 370/444; 370/280
(58) Field of Classification Search .................. 370/280, 370/252, 253, 316.329, 347, 431, 442, 444, 370/311; 455/522
See application file for complete search history.

(56) References Cited

U.S. PATENT DOCUMENTS

| | | | |
|---|---|---|---|
| 6,351,461 B1 | 2/2002 | Sakoda et al. | |
| 7,103,350 B2 | 9/2006 | Au et al. | |
| 7,412,254 B2 | 8/2008 | Senarath et al. | |
| 7,733,977 B2 | 6/2010 | Kuri et al. | |
| 8,116,805 B2 | 2/2012 | Das et al. | |
| 2004/0141483 A1 | 7/2004 | Zeira et al. | |
| 2005/0220176 A1 | 10/2005 | Zeira et al. | |
| 2006/0094372 A1 | 5/2006 | Ahn et al. | |
| 2007/0254652 A1 * | 11/2007 | Khan et al. | 455/435.1 |
| 2008/0232332 A1 | 9/2008 | Kaminski et al. | |
| 2008/0280638 A1 | 11/2008 | Malladi et al. | |
| 2009/0125363 A1 | 5/2009 | Frederiksen et al. | |
| 2009/0285160 A1 | 11/2009 | Cheng et al. | |
| 2010/0027688 A1 | 2/2010 | Suh et al. | |
| 2010/0173638 A1 | 7/2010 | Aiba et al. | |
| 2010/0189080 A1 | 7/2010 | Hu et al. | |
| 2010/0210295 A1 | 8/2010 | Koc et al. | |

(Continued)

FOREIGN PATENT DOCUMENTS

CN 1545217 11/2004

(Continued)

OTHER PUBLICATIONS

Myung, H. G., et al., "Single Carrier FDMA for Uplink Wireless Transmission," IEEE Vehicular Technology Magazine, Sep. 2006, pp. 30-38.

(Continued)

*Primary Examiner* — Gary Mui
(74) *Attorney, Agent, or Firm* — Slater & Matsil, L.L.P.

(57) ABSTRACT

In accordance with an embodiment, a method of operating a base station configured to operate with user devices includes scheduling transmission for the user devices. Scheduling transmission includes determining a first fading metric for at least one user device from the at least one user device to the base station, determining at a second fading metric for the at least one user device from the at least one user device to at least one other base station, and determining a priority metric for the at least one user device based on the first and second fading metrics. The priority metric is configured to assign a higher priority to a user device with a first fading metric indicating an up-fade and the second fading metric indicating a down-fade. The method further includes transmitting a transmission schedule to the at least one user device based the priority metric.

30 Claims, 4 Drawing Sheets

| | Up- faded (+) or Downfaded (--) | | | | | | | |
|---|---|---|---|---|---|---|---|---|
| S | + | + | + | + | -- | -- | -- | -- |
| I1 | + | + | -- | -- | + | + | -- | -- |
| I2 | + | -- | + | -- | + | -- | + | -- |
| RBs: | (1) | (2) | (3) | (4) | (5) | (6) | (7) | (8) |

U.S. PATENT DOCUMENTS

| | | |
|---|---|---|
| 2010/0304776 A1 | 12/2010 | Wu et al. |
| 2011/0039569 A1 | 2/2011 | Narasimha et al. |
| 2011/0310879 A1 | 12/2011 | Wu et al. |

FOREIGN PATENT DOCUMENTS

| | | |
|---|---|---|
| CN | 101272172 | 9/2008 |
| CN | 101272388 | 9/2008 |
| CN | 101305538 | 11/2008 |
| CN | 101370240 | 2/2009 |
| CN | 101378299 | 3/2009 |
| CN | 101399572 | 4/2009 |
| CN | 101626260 | 1/2010 |
| JP | 2008072722 | 3/2008 |
| WO | WO2008/073013 | 6/2008 |
| WO | WO2008/076940 | 6/2008 |
| WO | WO2009/100567 | 8/2009 |
| WO | WO2009/138841 | 11/2009 |

OTHER PUBLICATIONS

Dahlman, E., et al., "Key Features of the LTE Radio Interface," Ericsson Review, 2008, pp. 77-80, No. 2.

"3rd Generation Partnership Project; LTE; Evolved Universal Terrestrial Radio Access (E-UTRA); Physical layer procedures," Technical Specification 136.213, Feb. 2009, pp. 1-75, vol. 8.5.0.

"3rd Generation Partnership Project, Evolved Universal Terrestrial Radio Access (E-UTRA); Medium Access Control (MAC) protocol specification," Technical Specification 136.321, Jan. 2009, pp. 1-44, vol. 8.4.0.

"3rd Generation Partnership Project, Evolved Universal Terrestrial Radio Access (E-UTRA); Physical layer procedures," Technical Specification 36.213, Mar. 2009, pp. 1-77, vol. 8.6.0.

Jalali, A., et al., "Data Throughput of CDMA-HDR a High Efficiency-High Data Rate Personal Communication Wireless System," IEEE 51st Vehicular Technology Conference Proceedings, 2000, 6 pages, vol. 3.

International Search Report, PCT International Application No. CN2011/070409, dated Apr. 21, 2011, 3 pages.

Notification of Transmittal of the International Search Report and the Written Opinion of the International Searching Authority, or the Declaration, International Application No. PCT CN2011/070409, dated Apr. 21, 2011, 3 pages.

Written Opinion of the International Searching Authority, International Application No. PCT CN2011/070409, dated Apr. 21, 2011, 4 pages.

Senarah, Gamini et al., "Power Control and ICIC for Uplink in LTE," Huawei Technologies, Co., Ltd., Aug. 14, 2009, 8 pages.

Yates, R. et al., "Integrated power control and base station assignment" IEEE Transactions on Vehicular Technology, vol. 44, No. 3, Aug. 1995, pp. 638-644.

Xiao, Weimin et al., "Uplink Power Control, Interference Coordination and Resource Allocation for 3GPP E-UTRA" IEEE Vehicular Technology Conference, Sep. 2006, 5 pages.

Gjendemsjo, Anders et al., "Binary Power Control for Sum Rate Maximization over Multiple Interfering Links" IEEE Transactions on Wireless Communications, vol. 7, No. 8, Aug. 2008, pp. 3164-3173.

Hande, Prashanth et al., "Distributed Uplink Power Control for Optimal SIR Assignment in Cellular Data Networks" IEEE Communications Society, Proceedings IEEE Infocom, 2006, 13 pages.

Yates, Roy "A Framework for Uplink Power Control in Cellular Radio Systems" IEEE Journal on Selected Areas in Communications, vol. 13, No. 7, Sep. 1995, pp. 1341-1347.

Zander, Jens "Performance of Optimum Transmitter Power Control in Cellular Radio System" IEEE Transactions on Vehicular Technology, vol. 41, No. 1, Feb. 1992, pp. 57-62.

Halpern, Samuel W., "Reuse Partitioning in Cellular Systems" Proceedings of 33rd IEEE Vehicular Technology Conference, vol. 33, May 1983, pp. 322-327.

Foschini, Gerard J. et al., "A Simple Distributed Autonomous Power Control Algorithm and its Convergence" IEEE Transactions on Vehicular Technology, vol. 42, No. 4, Nov. 1993, pp. 641-646.

3GPP TSG RAN v8.8.0, "Evolved Universal Terrestial Radio Access: Physical Layer Procedures (3GPP TS 36.213)" 2009, 79 pages.

Knopp, R. "Information Capacity and Power Control in Single-Cell Multiuser Communications" Proceedings of IEEE International Conference on Communications, vol. 1, 1995, pp. 331-335.

Senarath, Gamini et al., "Multi-hop Relay System Evaluation Methodology (Channel Model and Performance Metric)" IEEE 802.16 Broadband Wireless Acess Working Group, http://ieee802.org/16>, Feb. 2007, 46 pages.

PCT International Search Report and Written Opinion, PCT/CN2011/070890, Huawei Technologies Co., Ltd. et al., mailed May 19, 2011; 9 pages.

Notification of Transmittal of The International Search Report and The Written Opinion of the International Searching Authority, or the Declaration; Huawei Technologies, Co., Ltd, et al., PCT/CN2010/079496, dated Mar. 17, 2011, 11 pages.

\* cited by examiner

| | Up- faded (+) or Downfaded (--) | | | | | | | |
|---|---|---|---|---|---|---|---|---|
| S | + | + | + | + | -- | -- | -- | -- |
| I1 | + | + | -- | -- | + | + | -- | -- |
| I2 | + | -- | + | -- | + | -- | + | -- |
| RBs: | (1) | (2) | (3) | (4) | (5) | (6) | (7) | (8) |

SYSTEM AND METHOD FOR SCHEDULING USERS ON A WIRELESS NETWORK

TECHNICAL FIELD

The present invention relates generally to wireless communication systems, and more particularly to a system and method for power control.

BACKGROUND

Wireless communication systems are widely used to provide voice and data services for multiple users using a variety of access terminals such as cellular telephones, laptop computers and various multimedia devices. Such communications systems can encompass local area networks, such as IEEE 801.11 networks, cellular telephone and/or mobile broadband networks. The communication system can use a one or more multiple access techniques, such as Frequency Division Multiple Access (FDMA), Time Division Multiple Access (TDMA), Code Division Multiple Access (CDMA), Orthogonal Frequency Division Multiple Access (OFDMA), Single Carrier Frequency Division Multiple Access (SC-FDMA) and others. Mobile broadband networks can conform to a number of system types or partnerships such as, General Packet Radio Service (GPRS), 3rd-Generation standards (3G), Worldwide Interoperability for Microwave Access (WiMAX), Universal Mobile Telecommunications System (UMTS), the 3rd Generation Partnership Project (3GPP), Evolution-Data Optimized EV-DO, or Long Term Evolution (LTE).

In wireless communication systems, the desired signal level as well as the interference level fluctuates in time due to temporal fading. In systems where multiple users share the same time slot or frequency bandwidth, highest performance is achieved when transmissions occur when the desired signal level is high and the interference level is low. This happens as naturally in downlink transmissions for some systems, such as LTE that are configured to have a user terminal transmit a latest C/I value to the base station. In noise limited systems, the C/I value is highest when the desired signal is at the highest level and the interference is at the lowest level. The LTE base station, therefore, assigns a user terminal a given resource block (RB), when the C/I is relatively high using a certain priority criterion. Since transmitting stations are typically stationary, the reason for the fluctuation of C/I is the temporal fading of the desired and interference signals. However, measurement error and the delay in reporting (feedback delay) may result in the transmitting stations not transmitting at the best times with respect to temporal fading. For a slow moving or stationary user terminal, the prediction error due to the feedback delay of the C/I measurement is negligible and only measurement error is the issue. In LTE, a 40-80% capacity improvement can be obtained applying this technique if there are greater than about 20 user terminals per sector.

In an uplink channel, however, interference is unpredictable because mobile user terminals are moving with respect to each other, and because resource blocks are constantly being reassigned. A C/I measurement taken at one instant is often invalid a short time later because of the fast changing multipath environment and the change of the transmitter, which is in this case, is the UE. It is, therefore, very difficult for conventional communication systems to efficiently schedule transmissions to match signal and interference fading of the multipath environment.

SUMMARY OF THE INVENTION

In accordance with an embodiment, a method of operating a base station configured to operate with user devices includes scheduling transmission for the user devices. Scheduling transmission includes determining a first fading metric for at least one user device from the at least one user device to the base station, determining a second fading metric for the at least one user device from the at least one user device to at least one other base station, and determining a priority metric for the at least one user device based on the first and second fading metrics. The priority metric is configured to assign a higher priority to a user device with a first fading metric indicating an up-fade and the second fading metric indicating a down-fade. The method further includes transmitting a transmission schedule to the at least one user device based on the priority metric.

In according with another embodiment, the method further includes requesting the user device to increase a transmission power if the second metric indicates that interference to another base station is experiencing a down-fade. An amount of transmission power increase is determined by an estimated total amount of down-fading of the interference to another base station.

In accordance with a another embodiment, the amount of transmission power increase is further determined by a weighted sum of the estimated total amount of interference to a plurality of base stations. The weighting is performed according to a relative interference over thermal (IOT) level of each of the plurality of base stations.

In accordance with another embodiment, a method of operating a wireless network that includes a first transceiver configured to operate with a plurality of user devices is disclosed. The method includes determining a first fading metric for at least one of the plurality of user devices to the first transceiver, determining a second fading metric for the at least one of the plurality of user devices to at least one adjoining transceiver, and determining a priority metric for the at least one of the plurality of user devices based on the first fading metric and the second fading metric. Determining the first and second fading metrics includes determining the first and second fading metric for a plurality of resource blocks. The priority metric configured to assign a higher priority to a user device with a first fading metric indicating an up-fade and the second fading metric indicating a down-fade. The method further includes the first transceiver assigning the at least one the plurality of user devices at least one resource block.

In accordance with another embodiment of the present invention, a wireless base station includes transmitter and a receiver. The base station is configured to determine a first fading metric for at least one of a plurality of user devices to the base station for a plurality of resource blocks, and determine a second fading metric for the at least one of the plurality of user devices to at least one other transceiver for the plurality of resource blocks. The base station is further configured to determine a priority metric for the at least one of the plurality of user devices based on the first fading metric and the second fading metric, where the priority metric configured to assign a higher priority to a user device with a first fading metric indicating an up-fade and the second fading metric indicating a down-fade. The base station also assigns the at least one of the plurality of user devices at least one resource block.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of various embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to various embodiments in a specific context, namely resource scheduling a broadband wireless networks. Embodiments of the invention may also be applied to resource scheduling in other types of networks.

Figure 1:
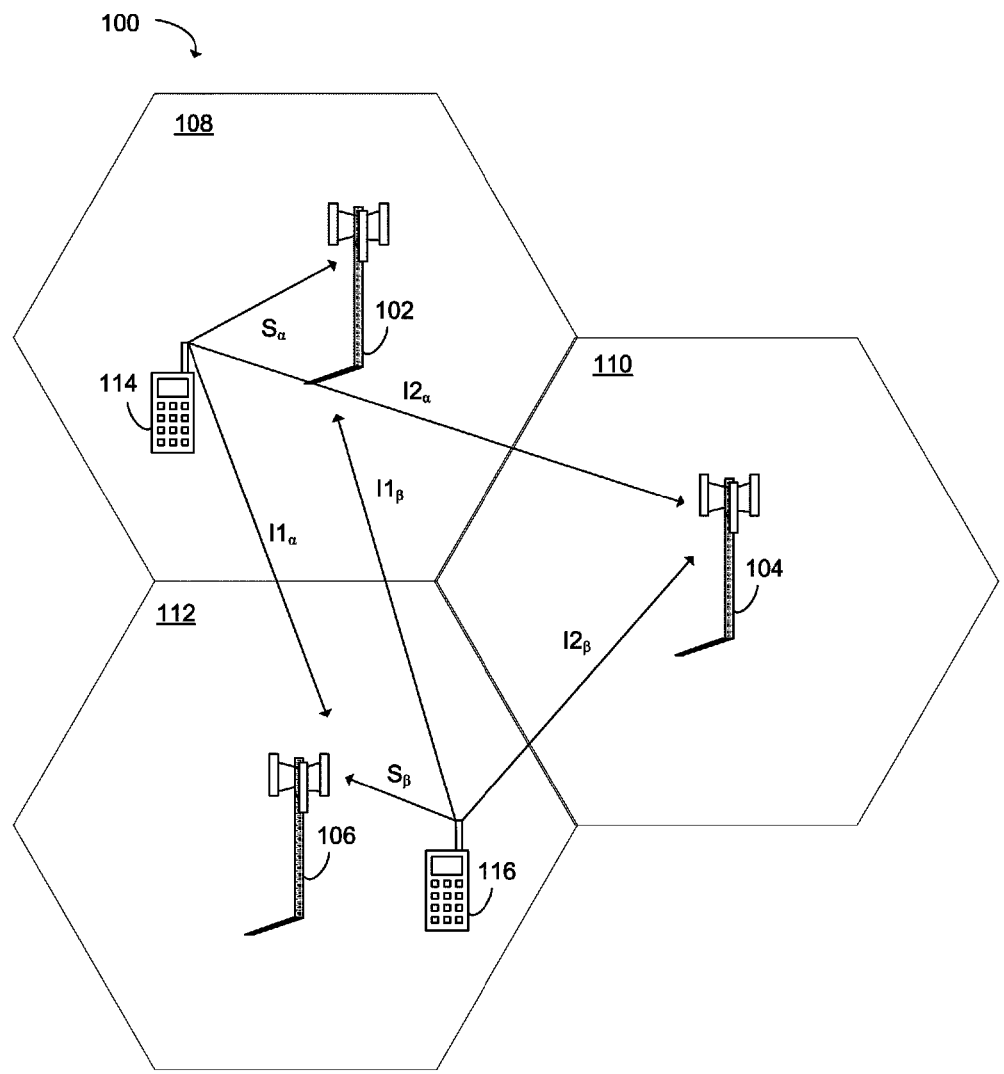
FIG. 1 illustrates a diagram of an embodiment mobile broadband system.

An illustration of an embodiment mobile broadband system 100 is illustrated in FIG. 1. Mobile broadband system 100 is divided into cells 108, 110 and 112, where each cell 108, 110 and 112 has corresponding base station 102, 104 and 106. Mobile terminals or user equipment (UE) 114 and 116 access network 100 through one of base stations 102, 104 and 106. Three base stations 108, 110 and 112 and two UEs 114 and 116 are used for simplicity of illustration, however, multiple cells and UEs can be used and provided for in real systems.

In an embodiment, UE 114 is assigned to cell 108, and transmits with a power $S_\alpha$ in the uplink channel to base station 102. The transmitted power of UE 114, however, also appears as interference power $I1_\alpha$ and $I2_\alpha$ at base stations 106 and 104 of cells 112 and 110, respectively. Likewise, UE 116 is assigned to cell 112, and transmits with a power $S_\beta$ in the uplink channel to base station 102. The transmitted power of UE 116 appears as interference power $I1_\beta$ and $I2_\beta$ at base stations 102 and 104 of cells 108 and 110, respectively. Assuming that UE's 114 and 116 used the same resource block, base station 102 receives both signal power $S_\alpha$ from UE 114 an $S_\alpha$ interference power $I1_\beta$ from UE 116. In a multipath environment, all powers $S_\alpha$, $I1_\alpha$, $I2_\alpha$, $S_\beta$, $I1_\beta$, $I2_\beta$ vary according to multipath conditions.

According to embodiments of the present invention, the variability of multipath environment on $S_\alpha$, $I1_\alpha$, $I2_\alpha$, $S_\beta$, $I1_\beta$, $I2_\beta$ is exploited to increase throughput and coverage performance. Uplink transmissions are scheduled when interference impact to adjoining cells is small. In further embodiments, uplink power control is adjusted so that the UE transmits with a higher power because the effect of its interference to adjoining cells is reduced.

Figure 2:
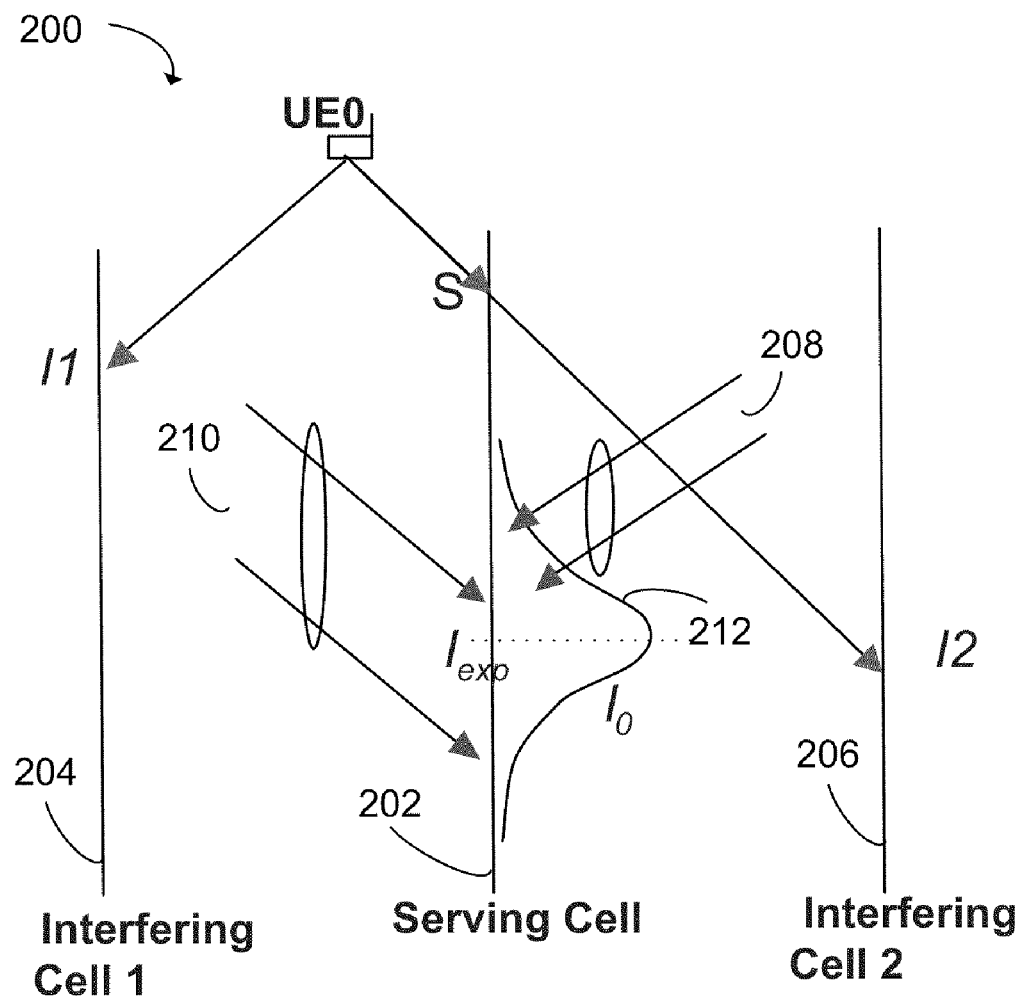
FIG. 2 illustrates a power diagram of an embodiment wireless system.

Turning to FIG. 2, a power diagram of a wireless system 200 is shown. UE0 transmits desired signal S to the serving cell represented by vertical line 202. The transmission of UE0 is also received by interfering cell 1, represented by vertical line 204, as signal I1, and by interfering cell 2, represented by vertical line 206, as signal I2. In FIG. 2, signals I1 and I2 represent the dominant interfering signals at interfering cells 1 and 2. The serving cell also receives aggregate interference signals 208 and 210 at an average power of Iexp. The actual total received power I0 of aggregate interfering signals 208 and 210 varies according to the multipath environment. The distribution of I0 is represented as Gaussian distribution 212, however, in the actual distribution of I0 may be distributed differently from a Gaussian distribution depending on the transmission and multipath environment.

An embodiment of the present invention takes into account three types of signal variations to improve the performance of uplink fade selective scheduling (FSS). The variations are signal S fluctuations due to fading, interference I1 and I2 fluctuation to other cells due to fading, and interference I0 from other cells to the serving cell due to fading. In embodiments, resources are ideally allocated when the amplitude of signal S is high and signals I1, I2 and I0 are low due to fading.

Following FSS scheduling methods in conventional systems, it is typical to schedule a UE to transmit based on the expected value $I_{exp}$ of aggregate interference 208 and 210, when the $S/I_{exp}$ is large. Because $I_{exp}$ can be unpredictable, some conventional systems transmit only when S is up-faded (i.e. at a maximum received level due to fading). In embodiments of the present invention, however, a UE is scheduled to transmit when its interference I1 and I2 to other cells is down-faded (i.e. at a minimum received level due to fading). If all UEs in a multi-cell system are scheduled such that interference to adjoining cells is minimized, the ratio the desired received signal S to interference $I_0$ from adjoining cells will be reduced.

In embodiments, down-fade measurements are used by the serving cell to determine when to schedule the UE for transmission. In an embodiment, the receiving signal can be measured by neighboring base stations when a UE is transmitting a specific reference signal, which is sometimes referred to as sounding. When uplink and downlink reciprocity can be assumed for short term signal fluctuations, as in the case of TDD systems, the UE can measure the downlink signal to determine fading information of the interference it causes to other stations. For example, a channel quality index (CQI) can be used. Alternatively, different common downlink pilot signals for each reuse group can be used for measurement in the case of Inter-cell Interference Control (ICIC) schemes. Interference measurements for I1 and I2 can be sent to the serving base station from neighboring cells, or they can be derived by the UE itself as indicated above. For example, in an embodiment, in the case of time division duplex (TDD), the fading of I1 and I2 to neighboring cells in the uplink channel can be estimated by the UE's received signal from neighboring cells in the downlink channel.

Figures 3, 4:
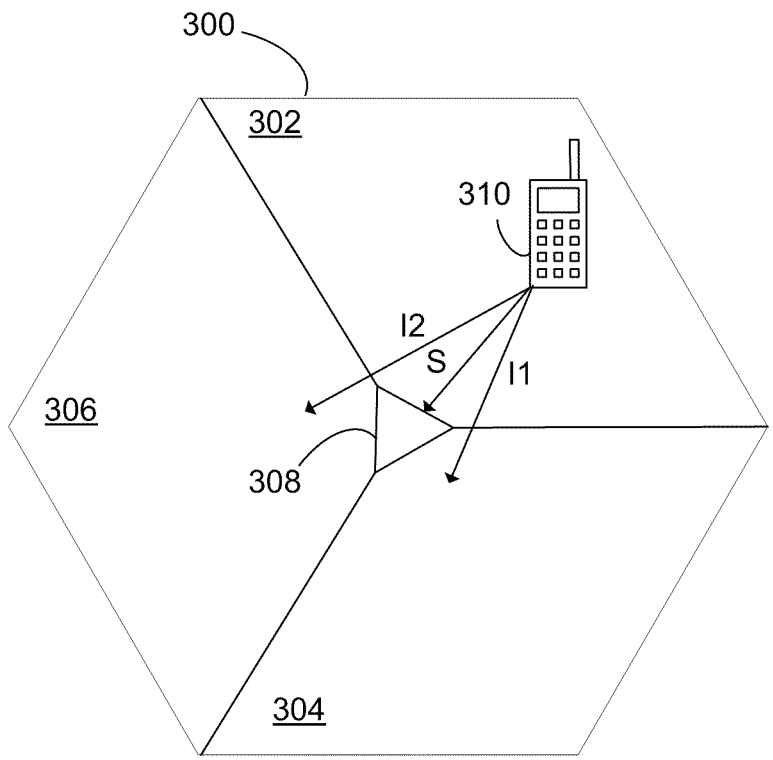
FIG. 3 illustrates a diagram of an embodiment cell with multiple sectors.
FIG. 4 illustrates an embodiment scheduling table.

FIG. 3 illustrates an embodiment cell 300 in which an embodiment FSS approach is applied among multiple sector of the same service cell 308. UE 310 transmits desired signal S within sector 302. Sectors 304 and 306, however receive the UE's transmission as interfering signals I1 and I2 respectively. In embodiments where the transceiver receiving interference from the UE is an a different sector of the same serving base station, interference measurements are available to the serving cell 308 directly. Therefore, FSS can be implemented for adjacent sectors 302, 304 and 306 without the need for new messaging over the backhaul. Such an embodiment approach can be used to improve the throughput of users located at sector boundaries. In some embodiments, embodiment algorithms can be used only for sectors in the same base station. In other embodiments, embodiment algorithms are used in other base stations as well as within different sectors of the same base station.

FIG. 4 illustrates an embodiment scheduling table 400 for a UE based on desired signal S and interference values I1 and I2 to neighboring cells. It should be noted that, while the interference to two neighboring cells is listed in table 400 for simplicity of illustration, the interference to any number of neighboring cells can be taken into account. The columns in table 400 represent different available resource blocks 1-8. In some embodiments these available resource blocks (RBs) can represent available uplink resources in frequency and/or time. For example, in LTE, an RB has a certain frequency band and a certain time duration. While table 400 shows 8 resource blocks for simplicity of illustration, an arbitrary number of resource blocks can be scheduled in embodiment algorithms. Each table entry contains either a "+" or a "−." The "+" represent that the respective signal is up-faded for the particular resource block, while the "−" represents that the respective signal is down-faded for the particular resource block. In the example embodiment table 400, resource block 4 represents a resource block with signal S is up-faded, and interference signals I1 and I2 are both down-faded. Likewise, resource block 5 represents the resource block with signal S is down-faded and interfering signals I1 and I2 upfaded. In an embodiment, an embodiment scheduling algorithm would choose resource block 4 because it maximizes desired signal level S and minimizes interference signals I1 and I2. An embodiment algorithm, on the other hand, may avoid using resource block 5 because it minimizes desired signal S and maximizes interference signals I1 and I2 to neighboring cells or sectors. FIG. 4 illustrates only two interfering signals I1 and I2, however, any number of interfering signals can be taken into account in embodiment algorithms.

In an embodiment, the choice of which interfering signals are taken into account depends on the strength of the interfering signals. For example if one interfering cell IA has a lower received amplitude than another interfering cell IB, then whether IB is upfaded or downfaded does not have a significant impact on the performance of the serving cell. Therefore, interfering signals IB and other interfering signals that are not dominant sources of interference can be omitted from some embodiment scheduling calculations. In an embodiment, an interfering signal can be considered non-dominant if the received interfering signal is more than 10 dB below the received signal level of the dominant interfering signal.

In an embodiment, a priority metric or index is derived for each UE. If the L strongest interference values of UE (or their quantized values) are known, an overall priority metric, p(S, I1, I2, ..., IL), can be evaluated for scheduling, where S is the signal at the serving station, and $I_i$ (i=1 ... L) are the interferences the UE causes to $i^{th}$ neighbor cell. The exact formula for p(S, I1, I2, ..., IL) depends on the actual implementation. For, a priority proportional to the ratio of S to interference can be assigned. Serving cell power S and interference powers I1 to IL can be combined linearly or with some other function. In some embodiment functions, additional information such as loading and target interference over thermal (IOT) values of each cell is taken into account. In embodiment, scheduling is performed by comparing one UE's priority with another UE's priority, where the UE with the highest priority is chosen for the particular time slot. In some embodiments, the priority metric based on the aggregated interference to a group of base stations.

One example embodiment opportunistic priority function is S/Imax, where the only the strongest interference is taken into account. In this case, the priority metric is maximized when Imax is minimized. Another embodiment opportunistic priority function is S/(I1+I2+ ... +IL). In this case, the priority metric is maximized when the sum of the L strongest interferences is down-faded, or the total interference to other cells and/or sectors is minimized. In one embodiment, the L strongest interferences are chosen to be the L interference values that are the closest to the target interference values for the respective neighboring cells and/or sectors. This embodiment is appropriate, for example, in systems that use inter-cell interference coordination (ICIC) where different cells have different target IOT levels.

A further embodiment opportunistic priority function is:

$$\log 2(1+S*\text{normalized\_sum}(\text{mean}(I_k)/(I_k*IOT_k)))$$

where $I_k$ represents the interference of the user to $k^{th}$ base station, S represents the UE's signal level received at the serving cell, $IOT_k$ represents the IOT of the $k^{th}$ base station. In some embodiments, the priority function is weighted by a relative interference over thermal (IOT) level for a group of base stations.

In an embodiment, if uplink and downlink reciprocity can be assumed for fast fading (e.g. TDD case), the downlink C/I (DL_CI) variation would mimic the uplink S/(I1+I2+...+IL) variation. Therefore, in an embodiment, the DL_CI can be used to determine when the uplink S/(I1+I2+ ... +IL) is maximum and directly used as the priority index for uplink scheduling. In embodiments, uplink and downlink reciprocity can be assumed if the uplink and downlink frequencies are the same or similar.

In an embodiment, a power control scheme takes into account the fading information of a UE's interfering signal. For example, the transmit power of the UE can be adjusted such that the interference is maintained at the same level as a no fading case. When the interference signal is down faded, the interference caused to that cell is reduced, therefore, UE transmit power can be increased proportionally to the reduction in interference received by neighboring cells and/or sectors. Such an embodiment method will also reduce the fluctuation of total interference of a cell.

In an example embodiment, if the magnitude of the down-fade of an interference signal equals ΔI1, the power can be increased by β*βI1, where β is a parameter to control the portion of the down-fade to be compensated. If multiple interference values are available, the interferences can be combined (linearly or non-linearly), depending on the scenario, to determine the power adjustment. In a further embodiment, interference values are further weighted by the target IOT of each cell in order to obtain a temporal power adjustment. In some embodiments that employ TDD, DL C/I measurements are used to reflect aggregate interference to neighboring cells (e.g., linear sum of interfering signals).

In an embodiment of the present invention employing a TDD mode, downlink channel estimates are used for the uplink channel state information due to reciprocity, the following priority metric is used:

$$p = \text{Inst\_DL\_CI}/\text{Mean\_DL\_CI},$$

where Inst_DL_CI, and Mean_DL_CI are the instantaneous and mean downlink C/I estimate, respectively, for the resource block, respectively. To use p in a scheduling decision, the priority metric p for each resource block is compared to each other, and each UE is assigned a resource block with a higher comparative priority metric p. In some embodiments, the priority of a UE for a resource block is decided based on other factors such as a UE's QoS requirement, the throughput a UE already had during recent times, etc. In such embodiments, the above priority factor can be multiplied by the other priority factors to obtain an overall priority index.

In an embodiment that further adjust the transmitted power of a UE in based on the priority metric, the power of the UE can be adjusted as follows:

$$\text{Power adjustment} = \text{Power\_with\_FPC} + \beta \times \text{Inst\_DL\_CI},$$

where Power_with_FPC is the transmitted power using a full power control algorithm, Inst_DL_CI is an instantaneous downlink C/I estimate, and β is a parameter used to control the portion of the down-fade to be compensated.

In an embodiment, the total amount of a transmission power increase is determined by an estimated total amount of down-fading of the interference to another base station. In further embodiments, the amount of transmission power increase is further determined by a weighted sum of the estimated total amount of interference to a group base stations, where the weighting is performed according to a relative interference over thermal (IOT) level of each of the plurality of base stations.

In a further embodiment, if a UE's strongest interfering cell (e.g., can be identified using the downlink, interference measurements) is the adjacent sector, then for that UE, the adjacent sector measures the signal received from the UE's sounding signal and reports the value to the serving cell. From these measurements, one can evaluate the up-faded RBs and use the metric, (Mean Interference/Instantaneous Interference), as a down-fade factor for that UE. This can be used for uplink scheduling prioritization as well as for uplink power adjustment in some embodiments.

In an embodiment, when there are multiple interfering base stations with different IOT targets, if the planned IOT target is large for a given base station for a given RB, no consideration is taken into account as to whether interference to that base station is up-faded or not, when assigning a UE to the particular RB. Alternatively, up-fading, down-fading, only up-fading or only-down fading can be taken into consideration.

Figure 5:
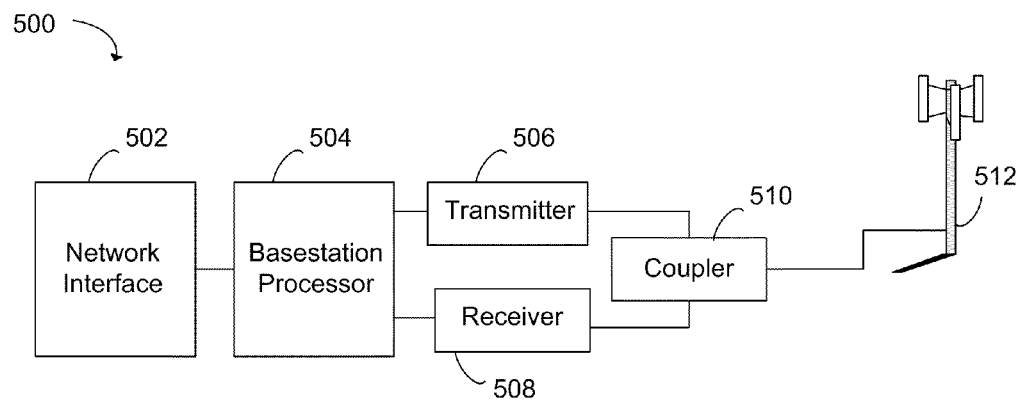
FIG. 5 illustrates a block diagram of an embodiment base station.

A block diagram of an embodiment base station 500 is illustrated in FIG. 5. Base station 500 has a base station processor 504 coupled to transmitter 506 and receiver 508, and network interface 502. Transmitter 506 and receiver 508 are coupled to antenna 512 via coupler 510. Base station processor 504 executes embodiment partition indexing algorithms. In embodiments of the present invention, base station 500 is configured to operate in a LTE network using an OFDMA downlink channel divided into multiple subbands and using single carrier FDMA in the uplink. In alternative embodiments, other systems, network types and transmission schemes can be used, for example, Wimax, and 1XEV-DO.

Figure 6:
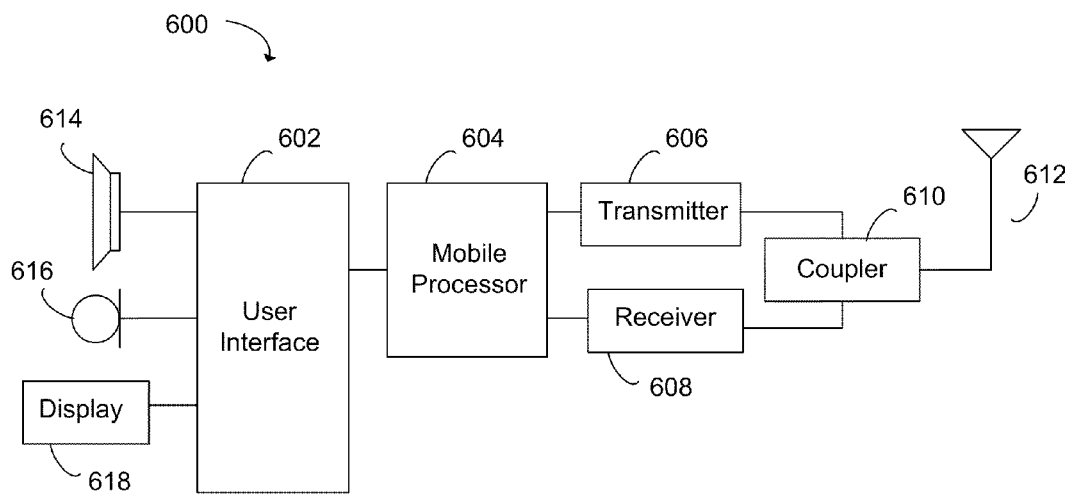
FIG. 6 illustrates a block diagram of an embodiment user device.

A block diagram of an embodiment user device 600 is illustrated in FIG. 6. User device 600 can be implemented, for example, as a cellular telephone, or other mobile communication device, such as a computer or network enabled peripheral. Alternatively, user device 600 can be a non-mobile device, such as a desktop computer with wireless network connectivity. User device 600 has mobile processor 604, transmitter 606 and receiver 608, which are coupled to antenna 612 via coupler 610. User interface 602 is coupled to mobile processor 604 and provides interfaces to loudspeaker 614, microphone 616 and display 618, for example. Alternatively, user device 600 may have a different configuration with respect to user interface 602, or user interface 602 may be omitted entirely.

Although present embodiments and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of operating a base station configured to operate with user devices, the method comprising:
   scheduling transmission for the user devices, scheduling comprising
   determining a first fading metric for at least one user device from the at least one user device to the base station,
   determining a second fading metric for the at least one user device from the at least one user device to at least one other base station,
   determining a priority metric for the at least one user device based on the first fading metric and the second fading metric, the priority metric configured to assign a higher priority to a user device with a first fading metric indicating an up-fade and the second fading metric indicating a down-fade, and
   transmitting a transmission schedule to the at least one user device based on determining the priority metric.

2. The method of claim 1, wherein determining the priority metric further comprises assigning a priority proportional to a ratio of the first fading metric to the second fading metric.

3. The method of claim 1, wherein:
   determining the first fading metric comprises determining the first fading metric for a plurality of resource blocks; and
   determining the second fading metric comprises determining the second fading metric for the plurality of resource blocks.

4. The method of claim 3, wherein
   scheduling transmission further comprises assigning at least one of the plurality of resource blocks to the at least user device based on the priority metric; and
   transmitting the transmission schedule further comprises transmitting to the user device the assigned at least one of the plurality of resource blocks.

5. The method of claim 3, wherein the plurality of resource blocks comprise time division duplex (TDD) slots.

6. The method of claim 3, wherein scheduling transmission comprises scheduling transmission in an uplink channel.

7. The method of claim 3, wherein
scheduling transmission comprises scheduling transmission in an uplink channel; and
determining the second fading metric comprises polling the at least one user device for downlink fading information to the at least one other base station.

8. The method of claim 7, wherein the downlink fading information comprises a channel quality index (CQI) measurement.

9. The method of claim 1, further comprising requesting the user device to increase a transmission power if the second metric indicates that interference to another base station is experiencing a down-fade, wherein an amount of transmission power increase is determined by an estimated total amount of down-fading of the interference to another base station.

10. The method of claim 9, wherein the amount of transmission power increase is further determined by a weighted sum of the estimated total amount of interference to a plurality of base stations, wherein the weighting is performed according to a relative interference over thermal (IOT) level of each of the plurality of base stations.

11. The method of claim 1, wherein
the at least one other base station has a different interference over thermal noise level (IOT) threshold than an IOT threshold of a further base station; and
determining the priority metric further comprises weighing the priority metric by a difference between the IOT threshold of the at least one other base station and the IOT threshold of the further base station.

12. The method of claim 1, wherein the at least one other base station comprises a base station to which the at least one user device is a dominant interferer.

13. A method of operating a wireless network comprising a first transceiver configured to operate with a plurality of user devices, the method comprising:
determining a first fading metric for at least one of the plurality of user devices to the first transceiver, determining the first fading metric comprising determining the first fading metric for a plurality of resource blocks;
determining a second fading metric for the at least one of the plurality of user devices to at least one other transceiver, determining the second fading metric comprising determining the second fading metric for the plurality of resource blocks;
determining a priority metric for the at least one of the plurality of user devices based on the first fading metric and the second fading metric, the priority metric configured to assign a higher priority to a user device with a first fading metric indicating an up-fade and the second fading metric indicating a down-fade; and
the first transceiver assigning the at least one the plurality of user devices at least one resource block.

14. The method of claim 13, wherein the first transceiver comprises a base station and the at least one other transceiver comprises an adjacent base station.

15. The method of claim 13, wherein the first transceiver comprises a first sector of a base station and the at least one other transceiver comprises at least one other sector of the base station.

16. The method of claim 15, wherein the step of determining the priority metric is performed only for sectors within the base station.

17. The method of claim 13, wherein at least one of the plurality of user devices comprises a cellular telephone.

18. The method of claim 13, wherein determining the second fading metric comprises polling the at least one user device for downlink fading information to the at least one other transceiver.

19. The method of claim 18, wherein downlink fading information comprises a channel quality index (CQI) measurement.

20. The method of claim 13, wherein:
the at least one other transceiver comprises a base station group; and
determining the priority metric further comprises determining the priority metric based on an aggregated interference to the base station group.

21. The method of claim 20, wherein the second fading metric to the base station group is weighted by a relative interference over thermal (IOT) level for the base station group for the at least one resource block.

22. The method of claim 13, wherein the wireless network comprises a mobile broadband network.

23. The method of claim 13, wherein determining the second fading factor further comprises the first transceiver receiving fading information from the at least one other transceiver, wherein the fading information is measured by the at least one other transceiver.

24. The method of claim 23, wherein the fading information comprises only information for down-fades or only information for up-fades.

25. A wireless base station comprising:
a transmitter; and
a receiver, wherein the base station is configured to
determine a first fading metric for at least one of a plurality of user devices to the base station for a plurality of resource blocks,
determine a second fading metric for the at least one of the plurality of user devices to at least one adjoining transceiver for the plurality of resource blocks,
determine a priority metric for the at least one of the plurality of user devices based on the first fading metric and the second fading metric, the priority metric configured to assign a higher priority to a user device with a first fading metric indicating an up-fade and the second fading metric indicating a down-fade, and
assign the at least one of the plurality of user devices at least one resource block.

26. The wireless base station of claim 25, wherein the at least one adjoining transceiver comprises a transceiver in a different sector of the base station.

27. The wireless base station of claim 25, wherein the at least one adjoining transceiver comprises an adjoining base station.

28. The wireless base station of claim 25, wherein the wireless base station is further configured to determine the second fading metric comprises polling the at least one of the plurality of user devices for downlink fading information to the at least one adjoining transceiver.

29. The wireless base station of claim 28, wherein downlink fading information comprises a channel quality index (CQI) measurement.

30. The wireless base station of claim 28, wherein the resource blocks comprise time division duplex (TDD) slots.

* * * * *